United States Patent
Bromley

(10) Patent No.: US 11,056,248 B2
(45) Date of Patent: Jul. 6, 2021

(54) HETEROGENEOUS CORE DESIGNS AND THORIUM BASED FUELS FOR HEAVY WATER REACTORS

(71) Applicant: ATOMIC ENERGY OF CANADA LIMITED, Chalk River (CA)

(72) Inventor: Blair P. Bromley, Deep River (CA)

(73) Assignee: ATOMIC ENERGY OF CANADA LIMITED, Chalk River (CA)

( * ) Notice: Subject to any disclaimer, the term of this patent is extended or adjusted under 35 U.S.C. 154(b) by 619 days.

(21) Appl. No.: 14/154,633

(22) Filed: Jan. 14, 2014

(65) Prior Publication Data
US 2014/0211904 A1    Jul. 31, 2014

Related U.S. Application Data

(60) Provisional application No. 61/753,851, filed on Jan. 17, 2013.

(51) Int. Cl.
| | |
|---|---|
| *G21C 5/20* | (2006.01) |
| *G21C 3/326* | (2006.01) |
| *G21C 3/62* | (2006.01) |
| *G21C 7/26* | (2006.01) |

(52) U.S. Cl.
CPC .............. *G21C 5/20* (2013.01); *G21C 3/326* (2013.01); *G21C 3/623* (2013.01); *G21C 7/26* (2013.01); *Y02E 30/30* (2013.01)

(58) Field of Classification Search
CPC ........ G21C 1/024; G21C 3/326; G21C 3/623; G21C 5/20; G21C 5/18
See application file for complete search history.

(56) References Cited

U.S. PATENT DOCUMENTS

| | | | | | |
|---|---|---|---|---|---|
| 3,211,621 | A | * | 10/1965 | Creagan ................... | G21C 1/08 376/173 |
| 3,396,078 | A | * | 8/1968 | Visner .................... | G21C 1/024 376/173 |
| 3,859,165 | A | * | 1/1975 | Radkowsky ............. | G21C 1/08 376/173 |

(Continued)

OTHER PUBLICATIONS

Sahin et al., "An assessment of thorium and spent LWR-fuel utilization potential in CANDU reactors" Energy Conversion and Management, 45, pp. 1067-1085, 2004.*

(Continued)

*Primary Examiner* — Sharon M Davis
(74) *Attorney, Agent, or Firm* — Knobbe, Martens, Olson & Bear LLP

(57) ABSTRACT

A channel type heterogeneous reactor core for a heavy water reactor for burnup of thorium based fuel is provided. The heterogeneous reactor core comprises at least one seed fuel channel region comprising seed fuel channels for receiving seed fuel bundles of thorium based fuel; and at least one blanket fuel channel region comprising blanket fuel channels for receiving blanket fuel bundles of thorium based fuel; wherein the seed fuel bundles have a higher percentage content of fissile fuel than the blanket fuel bundles. The seed fuel channel region and the blanket fuel channel region may be set out in a checkerboard pattern or an annular pattern within the heterogeneous reactor core. Fuel bundles for the core are also provided.

10 Claims, 16 Drawing Sheets

(56) References Cited

U.S. PATENT DOCUMENTS

| | | | |
|---|---|---|---|
| 5,737,375 A * | 4/1998 | Radkowsky | G21C 1/024 376/173 |
| 2009/0252278 A1 * | 10/2009 | Bashkirtsev | G21C 3/08 376/412 |
| 2010/0067644 A1 * | 3/2010 | D'Auvergne | G21C 3/30 376/294 |

OTHER PUBLICATIONS

"Status report 68-Enhanced CANDU 6 (EC6)" Jan. 2011, available at https://aris.iaea.org/sites/overview.html (Year: 2011).*

IAEA "Thorium fuel cycle-potential benefits and challenges" May 2005, IAEA-TECDOC-1450. (Year: 2005).*

Chan, P. "ACR Workshop—Core Design & Reactor Physics" AECL Presentation, Sep. 2002, available at https://canteach.candu.org/Content%20Library/20031205.pdf. (Year: 2002).*

Milgram, M.S., "Once Through Thorium Cycles in CANDU Reactors", Report AECL-7516, Atomic Energy of Canada Ltd. (1982). (Year: 1982).*

Craig, D. S. "Batch fueling with organic-cooled 61-element thorium dioxide." Atomic Energy of Canada Ltd., Chalk River, Ontario. Chalk River Nuclear Labs., 1972.

Ekholm, Reino. "Status and prospects of thermal breeders and their effect on fuel utilization: IAEA Technical Series Report 195 (1979)." (1980): 628.

Radkowsky, A. "Seed-Blanket Reactors", in CRC Handbook of Nuclear Reactor Calculations, vol. 3 (Y. Ronen, editor), CRC Press, 1986.

Ronen, Y. "High Converting Water Reactors," pp. 207-253, CRC Press, 1990.

Almgren, B. "Use of Thorium in Pressurized Heavy Water Reactors", U.S. AEC—Thorium Fuel Cycle: Proceedings of Second International Thorium Fuel Cycle Symposium, May 3-6, 1966, pp. 65-79, Feb. 1968.

* cited by examiner

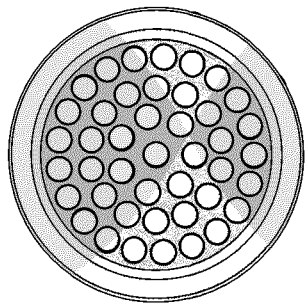
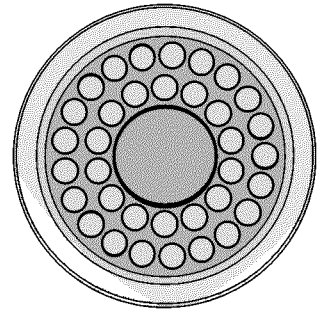
a) 35-Pu/Th (or 35-LEU/Th) with 8 Central Fuel Pins of $ThO_2$
Figure 1A
b) 35-Pu/Th (or 35-LEU/Th) with Central Zr-4 Tube Filled with Stagnant $D_2O$ Coolant
Figure 1B
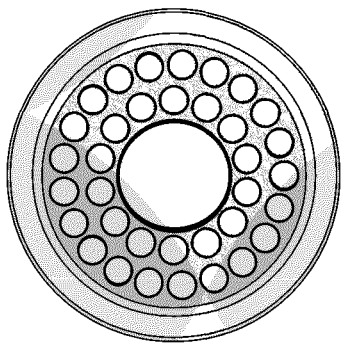
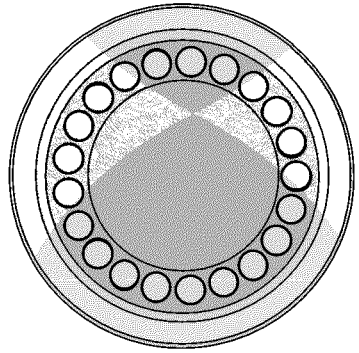
c) 35-Pu/Th (or 35-LEU/Th) with Central Zr-4 Tube Filled with $ZrO_2$
Figure 1C
d) 21-Pu/Th (or 21-LEU/Th) with Central Zr-4 Tube Filled with Stagnant $D_2O$ Coolant
Figure 1D
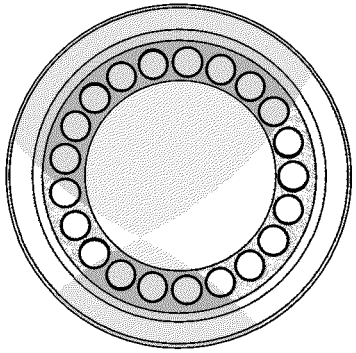
e) 21-Pu/Th (or 21-LEU/Th) with Central Zr-4 Tube Filled with $ZrO_2$
Figure 1E

| Row\Col | 1 | 2 | 3 | 4 | 5 | 6 | 7 | 8 | 9 | 10 | 11 | 12 | 13 | 14 | 15 | 16 | 17 | 18 | 19 | 20 | 21 | 22 | Row\Col |
|---|---|---|---|---|---|---|---|---|---|---|---|---|---|---|---|---|---|---|---|---|---|---|---|
| A | 0 | 0 | 0 | 0 | 0 | 0 | 0 | 0 | B | B | B | B | B | B | 0 | 0 | 0 | 0 | 0 | 0 | 0 | 0 | A |
| B | 0 | 0 | 0 | 0 | 0 | B | B | B | B | B | B | B | B | B | B | B | B | 0 | 0 | 0 | 0 | 0 | B |
| C | 0 | 0 | 0 | 0 | B | B | B | B | B | B | B | B | B | B | B | B | B | B | 0 | 0 | 0 | 0 | C |
| D | 0 | 0 | 0 | B | B | B | B | B | B | S | S | S | S | B | B | B | B | B | B | 0 | 0 | 0 | D |
| E | 0 | 0 | B | B | B | B | B | S | S | S | S | S | S | S | S | B | B | B | B | B | 0 | 0 | E |
| F | 0 | 0 | B | B | B | B | S | S | S | S | S | S | S | S | S | S | B | B | B | B | 0 | 0 | F |
| G | 0 | B | B | B | B | S | S | S | S | S | S | S | S | S | S | S | S | B | B | B | B | 0 | G |
| H | 0 | B | B | B | S | S | S | S | S | S | S | S | S | S | S | S | S | S | B | B | B | 0 | H |
| J | B | B | B | B | S | S | S | S | S | S | S | S | S | S | S | S | S | S | B | B | B | B | J |
| K | B | B | B | S | S | S | S | S | S | S | S | S | S | S | S | S | S | S | S | B | B | B | K |
| L | B | B | B | S | S | S | S | S | S | S | S | S | S | S | S | S | S | S | S | B | B | B | L |
| M | B | B | B | S | S | S | S | S | S | S | S | S | S | S | S | S | S | S | S | B | B | B | M |
| N | B | B | B | S | S | S | S | S | S | S | S | S | S | S | S | S | S | S | S | B | B | B | N |
| O | B | B | B | B | S | S | S | S | S | S | S | S | S | S | S | S | S | S | B | B | B | B | O |
| P | 0 | B | B | B | S | S | S | S | S | S | S | S | S | S | S | S | S | S | B | B | B | 0 | P |
| Q | 0 | B | B | B | B | S | S | S | S | S | S | S | S | S | S | S | S | B | B | B | B | 0 | Q |
| R | 0 | 0 | B | B | B | B | S | S | S | S | S | S | S | S | S | S | B | B | B | B | 0 | 0 | R |
| S | 0 | 0 | B | B | B | B | B | S | S | S | S | S | S | S | S | B | B | B | B | B | 0 | 0 | S |
| T | 0 | 0 | 0 | B | B | B | B | B | B | S | S | S | S | B | B | B | B | B | B | 0 | 0 | 0 | T |
| U | 0 | 0 | 0 | 0 | B | B | B | B | B | B | B | B | B | B | B | B | B | B | 0 | 0 | 0 | 0 | U |
| V | 0 | 0 | 0 | 0 | 0 | B | B | B | B | B | B | B | B | B | B | B | B | 0 | 0 | 0 | 0 | 0 | V |
| W | 0 | 0 | 0 | 0 | 0 | 0 | 0 | 0 | B | B | B | B | B | B | 0 | 0 | 0 | 0 | 0 | 0 | 0 | 0 | W |
| Row\Col | 1 | 2 | 3 | 4 | 5 | 6 | 7 | 8 | 9 | 10 | 11 | 12 | 13 | 14 | 15 | 16 | 17 | 18 | 19 | 20 | 21 | 22 | Row\Col |

| S | Seed Fuel Channel | B | Blanket Fuel Channel |
|---|---|---|---|

Core Layout – 1 Seed / 1 Blanket Region (1S-1B)

Figure 2

| Row\Col | 1 | 2 | 3 | 4 | 5 | 6 | 7 | 8 | 9 | 10 | 11 | 12 | 13 | 14 | 15 | 16 | 17 | 18 | 19 | 20 | 21 | 22 | Row\Col |
|---|---|---|---|---|---|---|---|---|---|---|---|---|---|---|---|---|---|---|---|---|---|---|---|
| A | 0 | 0 | 0 | 0 | 0 | 0 | 0 | 0 | B | B | B | B | B | B | 0 | 0 | 0 | 0 | 0 | 0 | 0 | 0 | A |
| B | 0 | 0 | 0 | 0 | 0 | B | B | B | B | B | B | B | B | B | B | B | B | 0 | 0 | 0 | 0 | 0 | B |
| C | 0 | 0 | 0 | 0 | B | B | B | B | S | S | S | S | S | S | B | B | B | B | 0 | 0 | 0 | 0 | C |
| D | 0 | 0 | 0 | B | B | B | B | S | S | S | S | S | S | S | S | B | B | B | B | 0 | 0 | 0 | D |
| E | 0 | 0 | B | B | B | B | S | S | S | S | S | S | S | S | S | S | B | B | B | B | 0 | 0 | E |
| F | 0 | 0 | B | B | B | S | S | S | S | S | S | S | S | S | S | S | S | B | B | B | 0 | 0 | F |
| G | 0 | B | B | B | S | S | S | S | S | S | S | S | S | S | S | S | S | B | B | B | 0 | G |   |
| H | 0 | B | B | S | S | S | S | S | S | B | B | B | B | S | S | S | S | S | S | B | B | 0 | H |
| J | B | B | S | S | S | S | S | S | B | B | B | B | B | B | S | S | S | S | S | S | B | B | J |
| K | B | B | S | S | S | S | S | B | B | B | B | B | B | B | B | S | S | S | S | S | B | B | K |
| L | B | B | S | S | S | S | S | B | B | B | B | B | B | B | B | S | S | S | S | S | B | B | L |
| M | B | B | S | S | S | S | S | B | B | B | B | B | B | B | B | S | S | S | S | S | B | B | M |
| N | B | B | S | S | S | S | S | B | B | B | B | B | B | B | B | S | S | S | S | S | B | B | N |
| O | B | B | S | S | S | S | S | B | B | B | B | B | B | B | B | S | S | S | S | S | B | B | O |
| P | 0 | B | B | S | S | S | S | S | S | B | B | B | B | S | S | S | S | S | S | B | 0 | P |   |
| Q | 0 | B | B | B | S | S | S | S | S | S | S | S | S | S | S | S | S | B | B | B | 0 | Q |   |
| R | 0 | 0 | B | B | B | S | S | S | S | S | S | S | S | S | S | S | B | B | B | 0 | 0 | R |   |
| S | 0 | 0 | B | B | B | B | S | S | S | S | S | S | S | S | S | B | B | B | B | 0 | 0 | S |   |
| T | 0 | 0 | 0 | B | B | B | B | S | S | S | S | S | S | S | S | B | B | B | B | 0 | 0 | 0 | T |
| U | 0 | 0 | 0 | 0 | B | B | B | B | S | S | S | S | S | S | B | B | B | B | 0 | 0 | 0 | 0 | U |
| V | 0 | 0 | 0 | 0 | 0 | B | B | B | B | B | B | B | B | B | B | B | 0 | 0 | 0 | 0 | 0 | 0 | V |
| W | 0 | 0 | 0 | 0 | 0 | 0 | 0 | 0 | B | B | B | B | B | B | 0 | 0 | 0 | 0 | 0 | 0 | 0 | 0 | W |
| Row\Col | 1 | 2 | 3 | 4 | 5 | 6 | 7 | 8 | 9 | 10 | 11 | 12 | 13 | 14 | 15 | 16 | 17 | 18 | 19 | 20 | 21 | 22 | Row\Col |

S  Seed Fuel Channel    B  Blanket Fuel Channel

Core Layout – 1 Seed / 2 Blanket Regions (1S-2B)

Figure 3

| Row\Col | 1 | 2 | 3 | 4 | 5 | 6 | 7 | 8 | 9 | 10 | 11 | 12 | 13 | 14 | 15 | 16 | 17 | 18 | 19 | 20 | 21 | 22 | Row\Col |
|---|---|---|---|---|---|---|---|---|---|---|---|---|---|---|---|---|---|---|---|---|---|---|---|
| A | 0 | 0 | 0 | 0 | 0 | 0 | 0 | 0 | B | B | B | B | B | B | 0 | 0 | 0 | 0 | 0 | 0 | 0 | 0 | A |
| B | 0 | 0 | 0 | 0 | 0 | B | B | B | B | S | S | S | S | B | B | B | B | 0 | 0 | 0 | 0 | 0 | B |
| C | 0 | 0 | 0 | 0 | B | B | B | S | S | S | S | S | S | S | S | B | B | B | 0 | 0 | 0 | 0 | C |
| D | 0 | 0 | 0 | B | B | S | S | S | B | B | B | B | B | B | S | S | S | B | B | 0 | 0 | 0 | D |
| E | 0 | 0 | B | B | S | S | B | B | B | S | S | S | S | B | B | B | S | S | B | B | 0 | 0 | E |
| F | 0 | 0 | B | S | S | B | B | S | S | S | S | S | S | S | S | B | B | S | S | B | 0 | 0 | F |
| G | 0 | B | B | S | B | B | S | S | B | B | B | B | B | B | S | S | B | B | S | B | B | 0 | G |
| H | 0 | B | S | S | B | S | S | B | B | S | S | S | S | B | B | S | S | B | S | S | B | 0 | H |
| J | B | B | S | B | B | S | B | S | S | S | S | S | S | B | B | S | B | B | S | B | B | J |  |
| K | B | S | S | B | S | S | B | S | S | B | B | S | S | S | B | S | S | B | S | S | B | K |  |
| L | B | S | S | B | S | S | B | S | S | B | S | S | B | S | S | B | S | S | B | S | S | B | L |
| M | B | S | S | B | S | S | B | S | S | B | S | S | B | S | S | B | S | S | B | S | S | B | M |
| N | B | S | S | B | S | S | B | S | S | S | B | B | S | S | S | B | S | S | B | S | S | B | N |
| O | B | B | S | B | B | S | B | B | S | S | S | S | S | B | B | S | B | B | S | B | B | O |  |
| P | 0 | B | S | S | B | S | S | B | B | S | S | S | S | B | B | S | S | B | S | S | B | 0 | P |
| Q | 0 | B | B | S | B | B | S | S | B | B | B | B | B | B | S | S | B | B | S | B | B | 0 | Q |
| R | 0 | 0 | B | S | S | B | B | S | S | S | S | S | S | S | S | B | B | S | S | B | 0 | 0 | R |
| S | 0 | 0 | B | B | S | S | B | B | B | S | S | S | S | B | B | B | S | S | B | B | 0 | 0 | S |
| T | 0 | 0 | 0 | B | B | S | S | S | B | B | B | B | B | B | S | S | S | B | B | 0 | 0 | 0 | T |
| U | 0 | 0 | 0 | 0 | B | B | B | S | S | S | S | S | S | S | S | B | B | B | 0 | 0 | 0 | 0 | U |
| V | 0 | 0 | 0 | 0 | 0 | B | B | B | B | S | S | S | S | B | B | B | 0 | 0 | 0 | 0 | 0 | 0 | V |
| W | 0 | 0 | 0 | 0 | 0 | 0 | 0 | 0 | B | B | B | B | B | B | 0 | 0 | 0 | 0 | 0 | 0 | 0 | 0 | W |
| Row\Col | 1 | 2 | 3 | 4 | 5 | 6 | 7 | 8 | 9 | 10 | 11 | 12 | 13 | 14 | 15 | 16 | 17 | 18 | 19 | 20 | 21 | 22 | Row\Col |

S | Seed Fuel Channel     B | Blanket Fuel Channel

Core Layout – 4 Seed / 4 Blanket Regions (4S-4B)

Figure 4

| Row\Col | 1 | 2 | 3 | 4 | 5 | 6 | 7 | 8 | 9 | 10 | 11 | 12 | 13 | 14 | 15 | 16 | 17 | 18 | 19 | 20 | 21 | 22 | Row\Col |
|---|---|---|---|---|---|---|---|---|---|---|---|---|---|---|---|---|---|---|---|---|---|---|---|
| A | 0 | 0 | 0 | 0 | 0 | 0 | 0 | 0 | B | B | B | B | B | B | 0 | 0 | 0 | 0 | 0 | 0 | 0 | 0 | A |
| B | 0 | 0 | 0 | 0 | 0 | B | B | B | S | S | S | S | S | S | B | B | B | 0 | 0 | 0 | 0 | 0 | B |
| C | 0 | 0 | 0 | 0 | B | S | S | S | S | S | S | S | S | S | S | S | S | B | 0 | 0 | 0 | 0 | C |
| D | 0 | 0 | 0 | B | S | S | S | S | S | S | S | S | S | S | S | S | S | S | B | 0 | 0 | 0 | D |
| E | 0 | 0 | B | S | S | S | S | S | S | S | S | S | S | S | S | S | S | S | S | B | 0 | 0 | E |
| F | 0 | 0 | B | S | S | S | S | S | S | S | S | S | S | S | S | S | S | S | S | B | 0 | 0 | F |
| G | 0 | B | S | S | S | S | S | S | S | S | S | S | S | S | S | S | S | S | S | S | B | 0 | G |
| H | 0 | B | S | S | S | S | S | S | S | S | S | S | S | S | S | S | S | S | S | S | B | 0 | H |
| J | B | S | S | S | S | S | S | S | S | S | S | S | S | S | S | S | S | S | S | S | S | B | J |
| K | B | S | S | S | S | S | S | S | S | S | S | S | S | S | S | S | S | S | S | S | S | B | K |
| L | B | S | S | S | S | S | S | S | S | S | S | S | S | S | S | S | S | S | S | S | S | B | L |
| M | B | S | S | S | S | S | S | S | S | S | S | S | S | S | S | S | S | S | S | S | S | B | M |
| N | B | S | S | S | S | S | S | S | S | S | S | S | S | S | S | S | S | S | S | S | S | B | N |
| O | B | S | S | S | S | S | S | S | S | S | S | S | S | S | S | S | S | S | S | S | S | B | O |
| P | 0 | B | S | S | S | S | S | S | S | S | S | S | S | S | S | S | S | S | S | S | B | 0 | P |
| Q | 0 | B | S | S | S | S | S | S | S | S | S | S | S | S | S | S | S | S | S | S | B | 0 | Q |
| R | 0 | 0 | B | S | S | S | S | S | S | S | S | S | S | S | S | S | S | S | S | B | 0 | 0 | R |
| S | 0 | 0 | B | S | S | S | S | S | S | S | S | S | S | S | S | S | S | S | S | B | 0 | 0 | S |
| T | 0 | 0 | 0 | B | S | S | S | S | S | S | S | S | S | S | S | S | S | S | B | 0 | 0 | 0 | T |
| U | 0 | 0 | 0 | 0 | B | S | S | S | S | S | S | S | S | S | S | S | S | B | 0 | 0 | 0 | 0 | U |
| V | 0 | 0 | 0 | 0 | 0 | B | B | B | S | S | S | S | S | S | B | B | B | 0 | 0 | 0 | 0 | 0 | V |
| W | 0 | 0 | 0 | 0 | 0 | 0 | 0 | 0 | B | B | B | B | B | B | 0 | 0 | 0 | 0 | 0 | 0 | 0 | 0 | W |
| Row\Col | 1 | 2 | 3 | 4 | 5 | 6 | 7 | 8 | 9 | 10 | 11 | 12 | 13 | 14 | 15 | 16 | 17 | 18 | 19 | 20 | 21 | 22 | Row\Col |

S | Seed Fuel Channel     B | Blanket Fuel Channel

Core Layout – 84% Seed / 16% Blanket

Figure 5

| Row\Col | 1 | 2 | 3 | 4 | 5 | 6 | 7 | 8 | 9 | 10 | 11 | 12 | 13 | 14 | 15 | 16 | 17 | 18 | 19 | 20 | 21 | 22 | Row\Col |
|---|---|---|---|---|---|---|---|---|---|---|---|---|---|---|---|---|---|---|---|---|---|---|---|
| A | 0 | 0 | 0 | 0 | 0 | 0 | 0 | 0 | B | B | B | B | B | B | 0 | 0 | 0 | 0 | 0 | 0 | 0 | 0 | A |
| B | 0 | 0 | 0 | 0 | 0 | B | B | B | B | B | B | B | B | B | B | B | B | 0 | 0 | 0 | 0 | 0 | B |
| C | 0 | 0 | 0 | 0 | B | B | B | B | S | S | B | B | S | S | B | B | B | B | 0 | 0 | 0 | 0 | C |
| D | 0 | 0 | 0 | B | B | B | B | B | S | S | B | B | S | S | B | B | B | B | B | 0 | 0 | 0 | D |
| E | 0 | 0 | B | B | S | S | S | S | S | S | S | S | S | S | S | S | S | S | B | B | 0 | 0 | E |
| F | 0 | 0 | B | B | S | S | S | S | S | S | S | S | S | S | S | S | S | S | B | B | 0 | 0 | F |
| G | 0 | B | B | B | S | S | B | B | S | S | B | B | S | S | B | B | S | S | B | B | B | 0 | G |
| H | 0 | B | B | B | S | S | B | B | S | S | B | B | S | S | B | B | S | S | B | B | B | 0 | H |
| J | B | B | S | S | S | S | S | S | S | S | S | S | S | S | S | S | S | S | S | S | B | B | J |
| K | B | B | S | S | S | S | S | S | S | S | S | S | S | S | S | S | S | S | S | S | B | B | K |
| L | B | B | B | B | S | S | B | B | S | S | B | B | S | S | B | B | S | S | B | B | B | B | L |
| M | B | B | B | B | S | S | B | B | S | S | B | B | S | S | B | B | S | S | B | B | B | B | M |
| N | B | B | S | S | S | S | S | S | S | S | S | S | S | S | S | S | S | S | S | S | B | B | N |
| O | B | B | S | S | S | S | S | S | S | S | S | S | S | S | S | S | S | S | S | S | B | B | O |
| P | 0 | B | B | B | S | S | B | B | S | S | B | B | S | S | B | B | S | S | B | B | B | 0 | P |
| Q | 0 | B | B | B | S | S | B | B | S | S | B | B | S | S | B | B | S | S | B | B | B | 0 | Q |
| R | 0 | 0 | B | B | S | S | S | S | S | S | S | S | S | S | S | S | S | S | B | B | 0 | 0 | R |
| S | 0 | 0 | B | B | S | S | S | S | S | S | S | S | S | S | S | S | S | S | B | B | 0 | 0 | S |
| T | 0 | 0 | 0 | B | B | B | B | B | S | S | B | B | S | S | B | B | B | B | 0 | 0 | 0 | 0 | T |
| U | 0 | 0 | 0 | 0 | B | B | B | B | S | S | B | B | S | S | B | B | B | B | 0 | 0 | 0 | 0 | U |
| V | 0 | 0 | 0 | 0 | 0 | B | B | B | B | B | B | B | B | B | B | B | B | 0 | 0 | 0 | 0 | 0 | V |
| W | 0 | 0 | 0 | 0 | 0 | 0 | 0 | 0 | B | B | B | B | B | B | 0 | 0 | 0 | 0 | 0 | 0 | 0 | 0 | W |
| Row\Col | 1 | 2 | 3 | 4 | 5 | 6 | 7 | 8 | 9 | 10 | 11 | 12 | 13 | 14 | 15 | 16 | 17 | 18 | 19 | 20 | 21 | 22 | Row\Col |

Core Layout – 3-to-1 Checkerboard Seed-in-Blanket (3-to-1-S/B)

S | Seed Fuel Channel    B | Blanket Fuel Channel

Figure 6

| Row\Col | 1 | 2 | 3 | 4 | 5 | 6 | 7 | 8 | 9 | 10 | 11 | 12 | 13 | 14 | 15 | 16 | 17 | 18 | 19 | 20 | 21 | 22 | Row\Col |
|---|---|---|---|---|---|---|---|---|---|---|---|---|---|---|---|---|---|---|---|---|---|---|---|
| A | 0 | 0 | 0 | 0 | 0 | 0 | 0 | 0 | B | B | B | B | B | B | 0 | 0 | 0 | 0 | 0 | 0 | 0 | 0 | A |
| B | 0 | 0 | 0 | 0 | 0 | B | B | B | S | S | S | S | S | S | B | B | B | 0 | 0 | 0 | 0 | 0 | B |
| C | 0 | 0 | 0 | 0 | B | S | S | B | S | S | B | B | S | S | B | S | S | B | 0 | 0 | 0 | 0 | C |
| D | 0 | 0 | 0 | B | S | S | B | B | S | S | B | B | S | S | B | B | S | S | B | 0 | 0 | 0 | D |
| E | 0 | 0 | B | S | S | B | S | S | B | B | S | S | B | B | S | S | B | S | S | B | 0 | 0 | E |
| F | 0 | 0 | B | S | B | B | S | S | B | B | S | S | B | B | S | S | B | B | S | B | 0 | 0 | F |
| G | 0 | B | S | B | S | S | B | B | S | S | B | B | S | S | B | B | S | S | B | S | B | 0 | G |
| H | 0 | B | B | B | S | S | B | B | S | S | B | B | S | S | B | B | S | S | B | B | B | 0 | H |
| J | B | S | S | S | B | B | S | S | B | B | S | S | B | B | S | S | B | B | S | S | S | B | J |
| K | B | S | S | S | B | B | S | S | B | B | S | S | B | B | S | S | B | B | S | S | S | B | K |
| L | B | S | B | B | S | S | B | B | S | S | S | S | S | S | B | B | S | S | B | B | S | B | L |
| M | B | S | B | B | S | S | B | B | S | S | S | S | S | S | B | B | S | S | B | B | S | B | M |
| N | B | S | S | S | B | B | S | S | B | B | S | S | B | B | S | S | B | B | S | S | S | B | N |
| O | B | S | S | S | B | B | S | S | B | B | S | S | B | B | S | S | B | B | S | S | S | B | O |
| P | 0 | B | B | B | S | S | B | B | S | S | B | B | S | S | B | B | S | S | B | B | B | 0 | P |
| Q | 0 | B | S | B | S | S | B | B | S | S | B | B | S | S | B | B | S | S | B | S | B | 0 | Q |
| R | 0 | 0 | B | S | B | B | S | S | B | B | S | S | B | B | S | S | B | B | S | B | 0 | 0 | R |
| S | 0 | 0 | B | S | S | B | S | S | B | B | S | S | B | B | S | S | B | S | S | B | 0 | 0 | S |
| T | 0 | 0 | 0 | B | S | S | B | B | S | S | B | B | S | S | B | B | S | S | B | 0 | 0 | 0 | T |
| U | 0 | 0 | 0 | 0 | B | S | S | B | S | S | B | B | S | S | B | S | S | B | 0 | 0 | 0 | 0 | U |
| V | 0 | 0 | 0 | 0 | 0 | B | B | B | S | S | S | S | S | S | B | B | B | 0 | 0 | 0 | 0 | 0 | V |
| W | 0 | 0 | 0 | 0 | 0 | 0 | 0 | 0 | B | B | B | B | B | B | 0 | 0 | 0 | 0 | 0 | 0 | 0 | 0 | W |
| Row\Col | 1 | 2 | 3 | 4 | 5 | 6 | 7 | 8 | 9 | 10 | 11 | 12 | 13 | 14 | 15 | 16 | 17 | 18 | 19 | 20 | 21 | 22 | Row\Col |

Core Layout – 1-to-1 Checkerboard Seed-in-Blanket (1-to-1-S/B)

| S | Seed Fuel Channel | B | Blanket Fuel Channel |
|---|---|---|---|

Figure 7

Table 1
Composition of Reactor-Grade Plutonium (RGPu)[1]

| Isotope | Mass Number | Mass Fraction wt% of Pu |
|---|---|---|
| Pu-238 | 238.04955 | 2.75 |
| Pu-239 | 239.05216 | 51.96 |
| Pu-240 | 240.05381 | 22.96 |
| Pu-241 | 241.05685 | 15.23 |
| Pu-242 | 242.05874 | 7.10 |

[1] Composition comes from 217-123700-REPT-001 by J. Pencer. Based on sample SF97-4, composition of Pu in typical spent PWR fuel. See Y. Nakahara, K. Suyama, J. Inagawa, R. Nagaishi, S. Kurosawa, N. Kohno, M. Onuki, and H. Mochizuki, "Nuclide Composition Benchmark Data for Verifying Burn-up Codes on Light Water Reactor Fuels," Nuclear Technology, Volume 137, Number 2: pp. 111-126, 2002.

Table 2

Isotopic Composition of LEU

| Isotope | Mass Ratio |
|---|---|
| U-234/U[2] | 0.000380315 |
| U-235/U | 0.050000000 |
| U-238/U | 0.949619685 |
| O16/U | 0.134418107 |
| O17/U | 0.000054306 |

[2] The atom ratio of U-234 to U-235 in LEU is assumed to be the same as found in natural uranium, 0.00764.

Table 3

Description of Different Lattices Tested

| Case Number | Lattice Design | # Inner Fuel Pins | # Outer Fuel Pins | Inner Pins Material | Outer Pins Material | Central Region |
|---|---|---|---|---|---|---|
| 1 | 35-LEU/Th-8-Th | 8 | 35 | $ThO_2$ | $LEUO_2/ThO_2$ | 8 pins of $ThO_2$ |
| 2 | 35-LEU/Th | None | 35 | None | $LEUO_2/ThO_2$ | Zr-4 Tube with $D_2O$ |
| 3 | 35-LEU/Th-$ZrO_2$-Rod | None | 35 | None | $LEUO_2/ThO_2$ | Zr-4 Tube with $ZrO_2$ |
| 4 | 21-LEU/Th | None | 21 | None | $LEUO_2/ThO_2$ | Zr-4 Tube with $D_2O$ |
| 5 | 21-LEU/Th-$ZrO_2$-Rod | None | 21 | None | $LEUO_2/ThO_2$ | Zr-4 Tube with $ZrO_2$ |
| | | | | | | |
| 6 | 35-Pu/Th-8-Th | 8 | 35 | $ThO_2$ | $PuO_2/ThO_2$ | 8 pins of $ThO_2$ |
| 7 | 35-Pu/Th | None | 35 | None | $PuO_2/ThO_2$ | Zr-4 Tube with $D_2O$ |
| 8 | 35-Pu/Th-$ZrO_2$-Rod | None | 35 | None | $PuO_2/ThO_2$ | Zr-4 Tube with $ZrO_2$ |
| 9 | 21-Pu/Th | None | 21 | None | $PuO_2/ThO_2$ | Zr-4 Tube with $D_2O$ |
| 10 | 21-Pu/Th-$ZrO_2$-Rod | None | 21 | None | $PuO_2/ThO_2$ | Zr-4 Tube with $ZrO_2$ |

Figure 10

Table 4
Dimensions of Components for Various Lattices Tested

| Case # | Lattice Design* | Central Region | Fuel Pellet Radius (cm) | Fuel Clad Outer Radius (cm) | Zr-4 Tube Inner Radius (cm) | Zr-4 Tube Outer Radius (cm) | PT Inner Radius (cm) | PT Outer Radius (cm) | CT Inner Radius (cm) | CT Outer Radius (cm) |
|---|---|---|---|---|---|---|---|---|---|---|
| 1 | 35-LEU/Th-8-Th | 8 pins of ThO$_2$ | 0.53025 | 0.573787 | N/A | N/A | 5.1689 | 5.6032 | 6.4478 | 6.5875 |
| 2 | 35-LEU/Th | Zr-4 Tube with D$_2$O | 0.53025 | 0.573787 | 2.23 | 2.38 | 5.1689 | 5.6032 | 6.4478 | 6.5875 |
| 3 | 35-LEU/Th-ZrO$_2$-Rod | Zr-4 Tube with ZrO$_2$ | 0.53025 | 0.573787 | 2.23 | 2.38 | 5.1689 | 5.6032 | 6.4478 | 6.5875 |
| 4 | 21-LEU/Th | Zr-4 Tube with D$_2$O | 0.53025 | 0.573787 | 3.35 | 3.50 | 5.1689 | 5.6032 | 6.4478 | 6.5875 |
| 5 | 21-LEU/Th-ZrO$_2$-Rod | Zr-4 Tube with ZrO$_2$ | 0.53025 | 0.573787 | 3.35 | 3.50 | 5.1689 | 5.6032 | 6.4478 | 6.5875 |
| 6 | 35-Pu/Th-8-Th | 8 pins of ThO$_2$ | 0.53025 | 0.573787 | N/A | N/A | 5.1689 | 5.6032 | 6.4478 | 6.5875 |
| 7 | 35-Pu/Th | Zr-4 Tube with D$_2$O | 0.53025 | 0.573787 | 2.23 | 2.38 | 5.1689 | 5.6032 | 6.4478 | 6.5875 |
| 8 | 35-Pu/Th-ZrO$_2$-Rod | Zr-4 Tube with ZrO$_2$ | 0.53025 | 0.573787 | 2.23 | 2.38 | 5.1689 | 5.6032 | 6.4478 | 6.5875 |
| 9 | 21-Pu/Th | Zr-4 Tube with D$_2$O | 0.53025 | 0.573787 | 3.35 | 3.50 | 5.1689 | 5.6032 | 6.4478 | 6.5875 |
| 10 | 21-Pu/Th-ZrO$_2$-Rod | Zr-4 Tube with ZrO$_2$ | 0.53025 | 0.573787 | 3.35 | 3.50 | 5.1689 | 5.6032 | 6.4478 | 6.5875 |

\* All lattices used a standard 28.575-cm square lattice pitch.

Figure 11

Table 5
Fuel Bundle Ring Specifications

| Ring | # Pins | Pitch Radius (cm) | Angle Offset (radians) |
|---|---|---|---|
| 1 | 1 | 0.000 | 0 |
| 2 | 7 | 1.725 | 0 |
| 3 | 14 | 2.970 | 0.2244 |
| 4 | 21 | 4.380 | 0 |

Figure 12

Table 6
Material Specifications for Key Components for Various Lattices Tested

| Component (where applicable) | Material | Temperature (K) | Density (g/cm³) | Comments |
|---|---|---|---|---|
| Inner Tube | Zr-4 | 561.16 | 6.4635 | |
| Inner Tube Filler | ZrO₂ | 561.16 | 4.26 | 75% of density |
| Inner Tube Filler | D₂O coolant | 561.16 | 0.8079 | Stagnant coolant is removed during voiding. |
| Inner Fuel Pins | ThO₂ | 859.99 | 9.7 | ThO₂ has lower density than either UO₂ or PuO₂ |
| Outer Fuel Pins | LEUO₂+ThO₂ or PuO₂+ThO₂ | 859.99 | 9.7 | Homogeneous mixture. Density set to that of ThO₂, as a conservative approximation. |
| Clad | Zr-4 | 561.16 | 6.4635 | |
| Coolant | 99.0 at% D₂O | 561.16 | 0.8079 | |
| PT | Zr-2.5Nb | 561.16 | 6.515 | |
| Gap | CO₂ | 451.66 | 0.00118 | |
| CT | Zr-4 | 342.16 | 6.544 | |
| Moderator | 99.833 at% D₂O | 342.16 | 1.08509 | |

Figure 13

Table 7
Mass Fractions for Elements/Isotopes in Various Fuel Types for Modified 35-Pu/Th-ZrO2-Rod Fuel Bundle

| Fuel Type* | $PuO_2$ | $ThO_2$ | Pu | Th | O | HM | Pu-fiss | Pu-fiss/HM | Th/HM | Pu/HM |
|---|---|---|---|---|---|---|---|---|---|---|
| BLNK-02 | 0.010 | 0.990 | 0.00882 | 0.87002 | 0.12115 | 0.878847 | 0.005928 | 0.0067453 | 0.989961 | 0.010039 |
| BLNK-03 | 0.015 | 0.985 | 0.01323 | 0.86563 | 0.12114 | 0.878864 | 0.008892 | 0.0101177 | 0.984942 | 0.015058 |
| BLNK-04 | 0.020 | 0.980 | 0.01765 | 0.86124 | 0.12112 | 0.878881 | 0.011856 | 0.0134900 | 0.979923 | 0.020077 |
| SEED-04 | 0.020 | 0.980 | 0.01765 | 0.86124 | 0.12112 | 0.878881 | 0.011856 | 0.0134900 | 0.979923 | 0.020077 |
| SEED-06 | 0.030 | 0.970 | 0.02647 | 0.85245 | 0.12108 | 0.878916 | 0.017784 | 0.0202342 | 0.969885 | 0.030115 |
| SEED-08 | 0.040 | 0.960 | 0.03529 | 0.84366 | 0.12105 | 0.878951 | 0.023712 | 0.0269779 | 0.959848 | 0.040152 |
| SEED-10 | 0.050 | 0.950 | 0.04411 | 0.83487 | 0.12101 | 0.878985 | 0.029640 | 0.0337210 | 0.949812 | 0.050188 |
| SEED-12 | 0.060 | 0.940 | 0.05294 | 0.82608 | 0.12098 | 0.879020 | 0.035568 | 0.0404636 | 0.939777 | 0.060223 |
| SEED-14 | 0.070 | 0.930 | 0.06176 | 0.81730 | 0.12095 | 0.879055 | 0.041496 | 0.0472057 | 0.929743 | 0.070257 |

* The fuel type "BLNK-xx" means that the fuel is used in the fuel channels designated in the core analysis as blanket fuel. The "xx" is an indicator for the fuel composition. When "xx" = "02", the fuel is 1 wt% $PuO_2$ / 99 wt%$ThO_2$. Take the value of "xx" and divide by 2 to get the wt% of $PuO_2$ in the fuel. The balance will be $ThO_2$. The fuel type "SEED-xx" means that the fuel is used in the fuel channels designated in the core analysis as seed fuel. The meaning of "xx" is the same.

Figure 14

Table 8
Performance Characteristics of Various Seed/Blanket Fuel Combinations in the 1S-1B Heterogeneous Seed/Blanket Core Design

| Core | core-mod 001-027 | core-mod 004-012 | core-mod 005-014 | core-mod 008-005 | core-mod 033-002 |
|---|---|---|---|---|---|
| Seed Fuel | SEED-06 | SEED-06 | SEED-06 | SEED-06 | SEED-08 |
| Blanket Fuel | BLNK-04 | BLNK-02 | BLNK-06 | BLNK-02 | BLNK-02 |
| Core Model | 1S-1B | 1S-1B | 1S-1B | 1S-1B | 1S-1B |
| # Seed Channels | 188 | 188 | 188 | 188 | 188 |
| # Blanket Channels | 192 | 192 | 192 | 192 | 192 |
| Bundles per shift | 2 | 2 | 2 | 2 | 4 |
| Direction | Bi-directional | Bi-directional | Bi-directional | Bi-directional | Bi-directional |
| % of Full Power (2,061 MWth) | 62.0 | 55.0 | 100.0 | 58.3 | 58.3 |
| Reactor Power (MWth) | 1278.4 | 1134.4 | 2,061.4 | 1202.4 | 1202.4 |
| Fission Power (MWth) | 1338.61 | 1187.83 | 2,158.49 | 1259.03 | 1259.03 |
| Max. Channel Power (kW) | 6386.64 | 6381.68 | 6389.88 | 6399.57 | 6404.51 |
| Max. Half-Bundle Power (kW) | 376.01 | 380.96 | 385.88 | 375.19 | 398.21 |
| Max. Bundle Power (kW) | 737.5 | 749.0 | 755.6 | 737.7 | 788.4 |
| Max. normalized LER | 1.1931 | 1.1931 | 1.1931 | 1.1931 | 1.2289 |
| Max. LER (kW/m) | 50.94 | 51.74 | 52.19 | 50.96 | 56.09 |
| Max. Channel | O-15 | M-16 | Q-16 | M-16 | M-16 |
| Max. Bundle | M-12 Bundle 3 | M-12 Bundle 3 | O-14 Bundle 3 | M-12 Bundle 3 | O-15 Bundle 9 |
| k-effective | 1.00253 | 1.00212 | 1.00198 | 1.00243 | 1.00257 |
| Core-average burnup (MWd/t) | 19,784.42 | 19,292.14 | 21,582.7 | 20,942.4 | 33,765.8 |
| Fissile Utilization (MWd/t-fiss) | 1,043,837 | 1,032,032 | 1,066,645 | 1,090,196 | 1,375,712 |
| CANDU-NU FU (MWd/t-fiss) | 1,056,338 | 1,056,338 | 1,056,338 | 1,056,338 | 1,056,338 |
| FU/FU-CANDU-NU | 0.988 | 0.977 | 1.010 | 1.032 | 1.302 |
| Blanket Burnup (MWd/t) | 20,177.3 | 20,071.0 | 19,838.9 | 40,944.2 | 40,947.4 |
| Seed Burnup (MWd/t) | 19,692.1 | 19,191.8 | 23,111.7 | 19,298.9 | 32,784.9 |
| Blanket Bundles per Year | 359.20 | 196.59 | 1306.04 | 127.60 | 125.34 |
| Seed Bundles per Year | 1532.20 | 1524.46 | 1489.53 | 1552.82 | 916.92 |
| Power Fraction Blanket | 0.19 | 0.12 | 0.43 | 0.15 | 0.15 |
| Power Fraction Seed | 0.81 | 0.88 | 0.57 | 0.85 | 0.85 |
| Bundles per Day | 5.2 | 4.7 | 7.7 | 4.6 | 2.9 |
| Re-fuelling Shifts per Day | 2.6 | 2.4 | 3.8 | 2.3 | 0.7 |
| FIR (discharged fuel) | 0.70 | 0.72 | 0.66 | 0.70 | 0.59 |
| CMCR | 0.63 | 0.64 | 0.59 | 0.62 | 0.54 |
| Energy Fraction from Th/U | 0.29 | 0.30 | 0.28 | 0.34 | 0.38 |

Figure 15

Table 9
Performance Characteristics of Various Seed/Blanket Fuel Combinations in the 84%Seed/16%Blanket Heterogeneous Seed/Blanket Core Design

| Core | core-mod-037-001 | core-mod-038-001 | core-mod-039-001 | core-mod-040-001 |
|---|---|---|---|---|
| Seed Fuel | SEED-06 | SEED-06 | SEED-08 | SEED-08 |
| Blanket Fuel | BLNK-04 | BLNK-02 | BLNK-02 | BLNK-04 |
| Core Model | 84%S-16%B | 84%S-16%B | 84%S-16%B | 84%S-16%B |
| # Seed Channels | 320 | 320 | 320 | 320 |
| # Blanket Channels | 60 | 60 | 60 | 60 |
| Bundles per shift | 2 | 2 | 4 | 4 |
| Direction | Bi-directional | Bi-directional | Bi-directional | Bi-directional |
| % of Full Power (2,061 MWth) | 93.0 | 93.0 | 90.0 | 93.0 |
| Reactor Power (MWth) | 1917.4 | 1917.4 | 1855.4 | 1917.4 |
| Fission Power (MWth) | 2007.71 | 2007.71 | 1942.8 | 2007.71 |
| Max. Channel Power (kW) | 6457.85 | 6527.48 | 6359.4 | 6462.44 |
| Max. Half-Bundle Power (kW) | 390.57 | 395.06 | 397.8 | 403.91 |
| Max. Bundle Power (kW) | 763.8 | 773.3 | 781.6 | 796.6 |
| Max. normalized LER | 1.1931 | 1.1931 | 1.2289 | 1.2289 |
| Max. LER (kW/m) | 52.76 | 53.42 | 55.61 | 56.68 |
| Max. Channel | R-12 | R-12 | R-13 | R-13 |
| Max. Bundle | M-12 Bundle 3 | M-12 Bundle 3 | N-12 Bundle 9 | R-12 Bundle 9 |
| k-effective | 1.00245 | 1.00272 | 1.00277 | 1.00283 |
| Core-average burnup (MWd/t) | 20,761.6 | 21,124.0 | 34,935.0 | 33,180.6 |
| Fissile Utilization (MWd/t-fiss) | 1,051,646 | 1,065,499 | 1,343,370 | 1,304,263 |
| CANDU-NU FU (MWd/t-fiss) | 1,056,338 | 1,056,338 | 1,056,338 | 1,056,338 |
| FU/FU-CANDU-NU | 0.996 | 1.009 | 1.272 | 1.235 |
| Blanket Burnup (MWd/t) | 19,718.5 | 40,671.6 | 40,683.0 | 19,672.5 |
| Seed Burnup (MWd/t) | 20,843.6 | 20,513.0 | 34,644.5 | 34,918.8 |
| Blanket Bundles per Year | 197.3 | 80.5 | 74.7 | 192.8 |
| Seed Bundles per Year | 2505.7 | 2576.2 | 1479.6 | 1498.5 |
| Power Fraction Blanket | 0.07 | 0.06 | 0.06 | 0.07 |
| Power Fraction Seed | 0.93 | 0.94 | 0.94 | 0.93 |
| Bundles per Day | 7.4 | 7.3 | 4.3 | 4.6 |
| Re-fuelling Shifts per Day | 3.7 | 3.6 | 1.1 | 1.2 |
| FIR (discharged fuel) | 0.67 | 0.68 | 0.55 | 0.56 |
| CMCR | 0.60 | 0.60 | 0.50 | 0.51 |
| Energy Fraction from Th/U | 0.28 | 0.30 | 0.35 | 0.33 |

Figure 16

HETEROGENEOUS CORE DESIGNS AND THORIUM BASED FUELS FOR HEAVY WATER REACTORS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority to and the benefit of U.S. provisional application 61/753,851, entitled HETEROGENEOUS CORE DESIGNS AND THORIUM BASED FUELS FOR HEAVY WATER REACTORS, and filed Jan. 17, 2013, the entire contents of which are hereby incorporated by reference.

BACKGROUND

Field

The invention relates to core designs for thorium based fuels for heavy water reactors and more specifically to heterogeneous core designs for thorium based seed fuel and blanket fuel for channel-type heavy water reactors as well as thorium based fuel bundles for a heterogeneous core design.

Description of the Related Art

Research into the use of thorium as a new primary energy source has recently been explored. Thorium-232 (Th-232) is a naturally occurring isotope and is substantially more abundant than uranium. Although not fissile, upon absorbing a neutron will transmute to uranium-233 (U-233), which is an excellent fissile fuel material. Thorium fuel concepts therefore require that Th-232 is first irradiated in a reactor to provide the necessary neutron dosing. The U-233 that is produced can either be chemically separated from the parent thorium fuel and recycled into new fuel, or the U-233 may be usable in-situ in the same fuel form.

Thorium fuels therefore require a fissile material as a driver so that a chain reaction (and thus supply of surplus neutrons) may be maintained. Fissile driver options are U-233, U-235 or Pu-239.

It is possible, although difficult, to design thorium fuels that produce more U-233 in thermal reactors than the fissile material they consume (this is referred to as having a fissile conversion ratio of more than 1.0 and is also called breeding). Thermal breeding with thorium is possible using U-233 as the fissile driver, and to achieve this the neutron economy in the reactor has to be very good (i.e., low neutron loss through escape or parasitic absorption). The possibility to breed fissile material in slow neutron systems is a unique feature for thorium-based fuels.

Another distinct option for using thorium is as a 'fertile matrix' for fuels containing transuranic elements such as plutonium. No new plutonium is produced from the thorium component, unlike for uranium fuels, and so the level of net consumption of this metal is rather high.

In fresh thorium fuel, all of the fissions (thus power and neutrons) derive from the driver component. As the fuel operates the U-233 content gradually increases and it contributes more and more to the power output of the fuel. The ultimate energy output from U-233, and hence indirectly thorium, depends on numerous fuel design parameters, including: fuel burnup attained, fuel arrangement, neutron energy spectrum and neutron flux. The fission of a U-233 nucleus releases about the same amount of energy (200 MeV) as that of U-235.

An important principle in the design of thorium fuel is that of fuel arrangements in which a high fissile (and therefore higher power) fuel zone referred to as the seed region is physically separated from the fertile (low or zero power) thorium part of the fuel referred to as the blanket region. Such an arrangement is far better for supplying surplus neutrons to thorium nuclei so they can convert to fissile U-233.

Previous heavy water reactor core designs and associated fuel for channel-type heavy water reactors using thorium-based fuels have not been able to achieve simultaneously high fuel burnup, high fissile utilization and high conversion ratios, while also meeting design goals of high core-average power densities, meeting goals of operating limits on bundle power and maximum linear element ratings while keeping reactivity coefficients, such as for example coolant void reactivity, within desired values to enhance safety characteristics.

Previous research in heavy water reactors have tended to focus on the design of homogeneous cores and heterogeneous fuel bundle designs that use neutron absorbing poisons to reduce void reactivity and has neglected to consider alternative design options.

A thorium fuel based core design and/or a fuel bundle design that mitigates one or more various shortcomings is therefore in need.

SUMMARY

Thorium is an attractive fuel option to improve the sustainability of the nuclear fuel cycle, given the limited and unevenly distributed uranium reserves. As natural thorium does not contain a fissile isotope, implementation of thorium fuels in a reactor must involve a fissile component, generally either plutonium or uranium. The physical separation of a lower fissile blanket fuel and a higher fissile seed fuel into separate adjacent regions in a heterogeneous reactor core allows for the potential to improve the fissile utilization and increase the sustainability of the thorium fuel cycle.

In one embodiment of the invention, there is provided a channel type heterogeneous reactor core for a heavy water reactor for burnup of thorium based fuel, the heterogeneous reactor core comprising at least one seed fuel channel region comprising seed fuel channels for receiving seed fuel bundles of thorium based fuel; and at least one blanket fuel channel region comprising blanket fuel channels for receiving blanket fuel bundles of thorium based fuel; wherein the seed fuel bundles have a higher percentage content of fissile fuel than the blanket fuel bundles.

In an additional embodiment to that outlined above, the at least one seed fuel channel region and the at least one blanket fuel channel region are set out in a checkerboard pattern within the heterogeneous reactor core.

In an additional embodiment to that outlined above, the at least one seed fuel channel region and the at least one blanket fuel channel region are set out in an annular pattern within the heterogeneous reactor core.

In an additional embodiment to that outlined above, the seed fuel bundle comprises 35% or more $UO_2$ and 65% or less $ThO_2$.

In an additional embodiment to that outlined above, the seed fuel bundle comprises 3% or more $PuO_2$ and 97% or less $ThO_2$.

In an additional embodiment to that outlined above, the blanket fuel bundle comprises 30% or less $UO_2$ and 70% or more $ThO_2$.

In an additional embodiment to that outlined above, the blanket fuel bundle comprises 2% or less PuO2 and 98% or more ThO2.

In another embodiment of the invention, there is provided a fuel bundle for use in a channel type heterogeneous reactor core of a heavy water reactor, the fuel bundle comprising a central displacement tube; and a plurality of thorium based fuel pins surrounding the central displacement tube.

In an additional embodiment to that outlined above, the central displacement tube is filled with ZrO2, MgO, BeO, graphite or stagnant D2O coolant.

In an additional embodiment to that outlined above, there are 21 radially positioned thorium based fuel pins surrounding the central displacement tube.

In an additional embodiment to that outlined above, there are 35 radially positioned thorium based fuel pins surrounding the central displacement tube.

In an additional embodiment to that outlined above, the fuel bundle is a seed fuel bundle and the plurality of thorium based fuel pins comprises a homogeneous mixture of (PuO2+ThO2) with a PuO2 content of 3% or higher.

In an additional embodiment to that outlined above, the fuel bundle is a seed fuel bundle and the plurality of thorium based fuel pins comprises a homogeneous mixture of (UO2+ThO2) with a UO2 content of 35% or higher.

In an additional embodiment to that outlined above, the fuel bundle is a blanket fuel bundle and the plurality of thorium based fuel pins comprises a homogeneous mixture of (PuO2+ThO2) with a PuO2 content of 2% or less.

In an additional embodiment to that outlined above, the fuel bundle is a blanket fuel bundle and the plurality of thorium based fuel pins comprises a homogeneous mixture of (UO2+ThO2) with a UO2 content of 30% or less.

In an additional embodiment, the present invention provides for the use of a fuel bundle such as those embodiments outlined above in channel type heterogeneous reactor core of a heavy water reactor for burnup of thorium based fuel.

BRIEF DESCRIPTION OF THE DRAWINGS

FIG. 1A-1E show illustrative schematic embodiments of 5 different fuel bundle designs according to the present invention;

FIG. 2 is a schematic illustrative of one embodiment of a heterogeneous core design for accommodated thorium based seed and blanket fuel bundles;

FIG. 3 is a schematic illustrative of another embodiment of a heterogeneous core design for accommodated thorium based seed and blanket fuel bundles;

FIG. 4 is a schematic illustrative of another embodiment of a heterogeneous core design for accommodated thorium based seed and blanket fuel bundles;

FIG. 5 is a schematic illustrative of another embodiment of a heterogeneous core design for accommodated thorium based seed and blanket fuel bundles;

FIG. 6 is a schematic illustrative of another embodiment of a heterogeneous core design for accommodated thorium based seed and blanket fuel bundles;

FIG. 7 is a schematic illustrative of another embodiment of a heterogeneous core design for accommodated thorium based seed and blanket fuel bundles;

FIG. 8 shows Table 1 relating to Composition of Reactor-Grade Plutonium (RGPu);

FIG. 9 shows Table 2 relating to Isotopic Composition of LEU;

FIG. 10 shows Table 3 relating to a Description of Different Lattices Tested;

FIG. 11 shows Table 4 relating to Dimensions of Components for Various Lattices Tested;

FIG. 12 shows Table 5 relating to Fuel Bundle Ring Specifications;

FIG. 13 shows Table 6 relating to Material Specifications For Key Components For Various Lattices Tested;

FIG. 14 shows Table 7 relating to Mass Fractions For Elements/Isotopes In Various Fuel Types For Modified 35-Pu/Th—Zr)2-Rod Fuel Bundles;

FIG. 15 shows Table 8 relating to Performance Characteristics Of Various Seed/Blanket Fuel Combinations In The 1S-1B Heterogeneous Seed/Blanket Core Design; and FIG. 16 shows Table 9 relating to Performance Characteristics Of Various Seed/Blanket Fuel Combinations In The 84% Seed/16% Blanket Heterogeneous Seed/Blanket Core Design.

DETAILED DESCRIPTION

A heterogeneous reactor core for a channel type heavy water reactor is provided. A channel-type heavy water reactor, similar to what is being currently used in nuclear power generation may be used as the initial basis for the design. The heterogeneous core comprises a lattice of channels for receiving seed or blanket fuel bundles in the channels as will be discussed below with reference to FIGS. 2-7. The core may contain from 25% to 84% seed fuel channels while the balance are blanket fuel channels.

The nuclear fuel is in the form of short, (~50 cm) or longer (>50 cm) fuel bundles made generally with one or two rings of fuel pins. It has been determined that to help minimize coolant void reactivity while maximizing fuel burnup and fissile utilization, the fuel bundle is designed to have only one or two rings of fuel pins, with a central displacer tube filled with stagnant coolant, or a solid moderator, for example graphite, or material with a low neutron scattering and low neutron absorption cross section, for example $ZrO_2$ or MgO. The fuel bundles will be discussed in more detail below with reference to FIGS. 1A-1E.

The nuclear fuel bundles are made from thorium, mixed with either plutonium or uranium, generally in oxide, carbine, silicide or a metallic-alloy form.

As depicted in various non-limiting embodiments in FIGS. 2-7, an embodiment of the reactor core of the is a heterogeneous design with physically separate regions of seed fuel channels and blanket fuel channels arranged in a lattice. In FIGS. 2-7, seed channels are represented by an S and blanket channels are represented by a B. Seed fuel is made with higher concentrations of fissile fuel mixed with thorium and is used primarily to generate power and excess neutrons to drive blanket fuel. The blanket fuel is made with lower concentrations of fissile fuel mixed with thorium and used primarily to convert fertile thorium fuel into fissile fuel. There is some power generation by the blanket fuel.

A seed channel, in one embodiment, is for seed bundles only while a blanket channel is for blanket bundles only.

In the embodiments shown, each channel of the heterogeneous core has 12 bundles (either seed or blanket).

As shown, the core may contain from 25% to 84% seed fuel channels, while the balance are blanket fuel channels. The core may have a lattice in a checkerboard-type arrangement of seed and blanket fuel channels such as those shown in FIGS. 6 and 7. Alternatively, the core may have a lattice in an annular arrangement of seed and blanket fuel channel regions with the outermost ring of the fuel channels adjacent to the radial reflector (not shown) of the core filled with blanket fuel channels such as those shown in FIGS. 2, 3, 4 and 5. It will be appreciated that there are several different permutations of heterogeneous seed/blanket core layouts which may be used or implemented and those shown in FIGS. 2 to 7 are not intended to be limited but rather illustrative of various embodiments of the concept of heterogeneous cores of the invention.

The heterogeneous core allows for different and dynamic refueling strategies as the blanket fuel regions and the seed fuel regions can be refueled at different rates to achieve desirable burnup levels and core power distributions. Refueling strategies will be discussed in more detail below.

The reactor core may be similar to current reactor cores such as the CANDU-6/EC-6 reactor which has 380 fuel channels with a square lattice pitch of 28.575 cm. Each channel thereof contains 12 fuel bundles, each approximately 50 cm long. Current CANDU cores use a homogeneous core of natural uranium (NU). Some more advanced designs use a single type of fuel and are still considered homogeneous.

Shown in FIGS. 1A-1E are embodiments of fuel bundles for use in the channels of the heterogeneous core.

As can be seen in the Figures, the fuel bundles include a central displacer tube to replace the central 8 fuel pins in a 43-element bundle, leaving outer rings of 14 and 21 fuel pins (FIGS. 1B and 1C). A further design, shown in FIGS. 1D and 1E includes a larger central displacer tube to replace the central 22 pins in a 43-element bundle leaving an outer ring of 21 fuel pins. Without wishing to be limited, the central displacer tube may be filled with $ZrO_2$, MgO, BeO, graphite or stagnant $D_2O$ coolant.

The purpose of the central displacer tube is to reduce coolant void reactivity (CVR). An advantage of the central displacer tube is that it helps to reduce the CVR, improving the safety characteristics of the lattice and the reactor during a postulated accident scenario, where there is a loss of coolant.

The fuel pins of either the 21-element bundle or the 35-element bundle may be a combination of plutonium and thorium or low enriched uranium and thorium depending on whether the bundle is for use in a seed fuel region or blanket fuel region.

In FIG. 1A, the inner 8 fuel pins are all the same, namely $ThO_2$ and the outer 35 fuel pins are all the same, namely a homogeneous mixture of $(PuO_2+ThO_2)$ or $(UO_2+ThO_2)$.

In the fuel bundles shown in FIGS. 1B and 1C, the 35 fuel pins are all the same, namely a homogeneous mixture of $(PuO_2+ThO_2)$ or $(UO_2+ThO_2)$ wherein the fuel bundle of FIG. 1B has central Zr-4 displacement tube filled with stagnant D2O coolant and the fuel bundle of FIG. 1C has a central Zr-4 displacement tube filled with ZrO2.

In the fuel bundles shown in FIGS. 1D and 1E, the 21 fuel pins are all the same, namely a homogeneous mixture of $(PuO_2+ThO_2)$ or $(UO_2+ThO_2)$ wherein the fuel bundle of FIG. 1D has central Zr-4 displacement tube filled with stagnant $D_2O$ coolant and the fuel bundle of FIG. 1E has a central Zr-4 displacement tube filled with $ZrO_2$.

In the embodiments of fuel bundles wherein $PuO_2$ is mixed with $ThO_2$, the Pu is "reactor grade" Pu. In embodiments of fuel bundles wherein $UO_2$ is mixed with $ThO_2$, then the U is LEU (low enriched uranium), with a fissile content of about 5 wt % U-235/U in one non-limiting embodiment. The volume fraction of $PuO_2$ in $(Pu+Th)O_2$ may range from 1% to 13% in various non-limiting embodiments. The volume fraction of $UO_2$ in $(U+Th)O_2$ may range from 5% to 70% in various non-limiting embodiments.

It will be appreciated that the mixture (volume fractions of either $PuO_2$ or $UO_2$ in $(Pu+Th)O_2$ or $(U+Th)O_2$) is dependent on whether the fuel is "seed" or "blanket" fuel. Seed fuel has a higher volume fraction of $PuO_2$ or $UO_2$ than blanket fuel.

Typically, seed fuel contains fuel with 3% or higher PuO2 in $(Pu,Th)O_2$, or 35% or higher $UO_2$ in $(U,Th)O_2$.

The choice of LEU (in the non-limiting embodiment shown, 5 wt % U-235/U) for mixing with thorium (Th) is generally based on practical and economic considerations. 5 wt % U-235/U is readily available from existing enrichment facilities throughout the world as is therefore more commonly used.

The choice of reactor grade Pu (generally about 0.67 wt % fissile Pu (Pu-239+Pu-241)) for mixing with Th is generally based on the assumption that most of the Pu inventory available in the world today is found in the spent fuel from light water reactors (LWRs). It is conceivable that one might use Pu from other sources, such as spent CANDU reactor natural uranium fuel, or Magnox reactor natural uranium fuel, or plutonium obtained from nuclear weapons stockpiles, or from a fast breeder reactor. In these other potential sources of plutonium, the fissile content will be different, probably higher. In principle, the plutonium from these alternative sources may be used in the heterogeneous reactor design as well, but given the assumption that the fissile plutonium content is higher, then the volume fraction of $PuO_2$ in $(Pu,Th)O_2$ would likely be lower to achieve the same level of burnup.

Generally, a typical seed fuel will contain 35% $UO_2$ (or more) and 65% $ThO_2$ (or less), or it will contain 3% $PuO_2$ (or more) and 97% (or less) of $ThO_2$. Whereas a typical blanket fuel will contain 30% $UO_2$ (or less) and 70% ThO2 (or more), or it will contain 2% $PuO_2$ (or less) and 98% (or more) of $ThO_2$.

The fraction of the core's fuel channels that are seed channels can range from about 25% to about 84%. In most designs, the fraction is approximately 50% seed fuel channels and 50% blanket fuel channels as shown for example in FIGS. 2, 4 and 7. The core layout shown in FIG. 5 includes approximately 84% seed channels (320 channels) and 16% blanket channels (60 channels).

An advantage of using more seed channels is that one can generate more power and achieve higher burnup while maintaining core reactivity. In addition, by using more seed the reactor may be operated at a higher power level, with a higher core-average power density.

Typically, most of the previous CANDU core designs involving thorium based fuels have assumed a homogeneous core with one fuel type.

The refuelling rates (and the core-average burnup of the fuel) depend on the choice of the fuel used (its initial enrichment), the desired radial and axial power distribution in the core, and the refuelling scheme. One refuelling scheme is a simple two-bundle shift, with bi-directional fuelling in alternating channels. Bundles are inserted from one side of the reactor, and are progressively moved to the other side until they reach the desired burnup.

The objective in adjusting the exit burnup in each channel (and hence the refuelling rate) is to ensure that the maximum bundle power stays below ~750 kW, and that the maximum channel power stays below ~6,500 kW. However, it is also ideal to make the radial and axial power distribution as flat as possible, in order to maximize the power generated in the core, for economic advantage.

The initial core designs used 35-element Pu/Th seed fuel that would achieve an approximate discharge burnup of 20 MWd/kg to 40 MWd/kg burnup. In most of the cases studied that meant using (3 wt % $PuO_2$/97 wt % $ThO_2$) for the seed to achieve a burnup of ~20 MWd/kg. For core-average burnups closer to 40 MWd/kg, this means using (4 wt % PuO2/96 wt % ThO$_2$). Most of the blanket fuel was either (2 wt % PuO$_2$/98 wt % ThO$_2$), burned to ~20 MWd/kg, or (1 wt % PuO2/99 wt % ThO$_2$) burned to 40 MWd/kg.

Heterogeneous cores with LEU/Th fuel have not been tested yet, but they would use the same methods that were used in the analysis of the cores with Pu/Th fuel.

There are two additional refuelling strategies to further improve the performance of the heterogeneous seed/blanket core, although these have not yet been tested:

1) To carry out axial shuffling of the fuel bundles in a given channel to help flatten the axial power distribution. This could be particularly useful in cores using seed fuel with higher levels of fissile enrichment (such as 5 wt % PuO$_2$/95 wt % ThO$_2$) and higher burnups (greater than 40 MWd/kg). The use of axial shuffling has been considered in the past by AECL in studies of CANDU reactor cores using SEU fuels (1.2 to 3 wt % U-235/U).

2) To send high enrichment, high-burnup seed fuel through a core twice or three times, somewhat analogous to what is done with batch refuelling in light water reactors. This is what would be called a 2TT (2 times through thorium) or 3TT (3 times through thorium) fuel cycle.

For example, a seed fuel bundle which is estimated to have enough reactivity (and initial fissile content) to achieve a large discharge burnup will go through the CANDU core in three passes in three different channels.

In addition, for example, a 35-element bundle might be made of (5 wt % PuO$_2$/95 wt % ThO$_2$) and lattice physics calculations indicate that it could achieve a final burnup of ~54 MWd/kg. Instead of pushing the burnup of the fuel bundle from 0 to 54 MWd/kg in a single pass through the core, it can be divided up into two or three passes through the core. If divided into 3 passes, then the fuel would be burned from 0 to 18 MWd/kg in the first pass in one channel, 18 to 36 MWd/kg in the 2nd pass in another channel, and finally 36 to 54 MWd/kg in the third pass through another channel. A smaller change in the burnup between the inlet and exit of a given fuel channel will help flatten the axial power distribution, and permit a higher core power density, while staying within limits of peak bundle power and peak channel power. This type of refuelling scheme combines the on-line, bi-directional, continuous refuelling features of a CANDU reactor with the multi-batch zone refuelling schemes of a light water reactor (such as a PWR).

Shown in FIGS. 8 to 16 are Tables 1 to 9 which set out geometry specifications and material specifications of the different fuel designs.

Table 1 in FIG. 8 shows an embodiment wherein the reactor grade plutonium contains ~52 wt % Pu-239 and ~15 wt % Pu-241, giving a total fissile content of ~67 wt % Pu-fissile/Pu.

Table 2 in FIG. 9 shows the isotopic composition of LEU in oxide form. Thus, the fissile content is ~5 wt % U-235/U and the balance of uranium is U-238 and U-234.

Table 3 in FIG. 10 shows a description of different lattices tested. There are 10 different lattice designs, which are differentiated by geometry (5 geometry types) and fuel type (two fuel types, either (U,Th)O$_2$ or (Pu,Th)O$_2$) in the outer 35 or 21 pins. Only bundle designs 1 and 6 have 8 central ThO$_2$ pins. All other pins are a mixture of either (U,Th)O$_2$ or (Pu,Th)O$_2$.

Table 4 in FIG. 11 shows the dimensions of components for various lattices tested. The dimensions are given for a fuel pellet made of (Pu,Th)O$_2$ or (U,Th)O$_2$, or ThO$_2$, the radius of the clad for the fuel element, the inner and outer radius for the central displacer tube, the inner and outer radius for the pressure tube (PT), the inner and outer radius for the calandria tube (CT).

Table 5 in FIG. 12 shows the number of fuel pins and the pitch circle and radius, and the angular offset for the first fuel pin in the bundle. Note: bundle design 1a is the only one that has 4 rings of fuel pins (1+7+14+21). Bundle designs 1b and 1c do not have a central pin or an inner ring of fuel pins, only two outer rings of fuel pins (14+21). Bundle designs 1d and 1e have only a single outer ring of 21 fuel pins.

Table 6 in FIG. 13 shows the material specifications for key components for various lattices tested. The type of material, its nominal operating temperature, and its nominal material mass density are given. The nominal purity of the heavy water moderator and the heavy water coolant are also specified. However, it should be pointed out that the purity of the heavy water in both the moderator and the coolant could be increased.

Table 7 in FIG. 14 shows the value of the mass fractions for Pu-fissile (Pu-239+Pu-241) Pu, Th, and O in (Pu,Th)O$_2$ for various volume fractions of PuO$_2$ in (Pu,Th)O$_2$. The fuels containing low volume fractions of PuO$_2$ (e.g., 2% or less) are considered blanket fuel, while the fuels containing higher volume fractions of PuO$_2$ (e.g. 3% or higher) are considered seed fuel.

Also shown below is a sample set of core calculation results for two cores (1S-1B, and 84% Seed/16% Blanket) with different combinations of Seed and Blanket fuels. The data for the 1S-1B core design is shown in Table 8/FIG. 15. This shows the various performance characteristics of 5 different core designs, which differ in the type of seed and blanket fuel used.

The data for the 84%-Seed/16% blanket core design is shown in Table 9/FIG. 16. This shows the various performance characteristics of 4 different core designs, which differ in the type of seed and blanket fuel used.

The above described heterogeneous reactor core and fuel bundles are intended to be illustrative of the invention and are not intended to be limiting in any way. It will be appreciated that modifications and alterations to the design, function or use of the heterogeneous reactor core and fuel bundles may be made which are within the sphere of the invention contemplated and are within the scope of the claims.

What is claimed is:

1. A channel type heterogeneous reactor core for a heavy water reactor for burnup of thorium based fuel, the heterogeneous reactor core comprising:
   at least one seed fuel channel region comprising seed fuel channels for receiving seed fuel bundles of thorium based fuel; and
   at least one blanket fuel channel region comprising blanket fuel channels for receiving blanket fuel bundles of thorium based fuel;
   wherein the seed fuel bundles have a higher percentage content of fissile fuel than the blanket fuel bundles;
   wherein the at least one seed fuel channel region and the at least one blanket fuel channel region are each substantially circular in cross-section and arranged in an annular pattern within the heterogeneous reactor core, an outermost ring of the heterogeneous reactor core comprising the at least one blanket fuel channel region;
   wherein the channel type heterogeneous reactor core is a CANDU reactor core; and wherein 49-51% of the channel type heterogeneous reactor core comprises the seed fuel channel region while the balance comprises the blanket fuel channel region.

2. The channel type heterogeneous reactor core of claim 1, wherein the seed fuel bundle comprises 35% or more $UO_2$ and 65% or less $ThO_2$.

3. The channel type heterogeneous reactor core of claim 1, wherein the seed fuel bundle comprises 3% or more $PuO_2$ and 97% or less $ThO_2$.

4. The channel type heterogeneous reactor core of claim 1, wherein the blanket fuel bundle comprises 30% or less $UO_2$ and 70% or more $ThO_2$.

5. The channel type heterogeneous reactor core of claim 1, wherein the blanket fuel bundle comprises 2% or less $PuO_2$ and 98% or more $ThO_2$.

6. The channel type heterogeneous reactor core of claim 1, wherein each seed fuel channel comprises 12 seed fuel bundles and each blanket fuel channel comprises 12 blanket fuel bundles.

7. The channel type heterogeneous reactor core of claim 1, wherein a total number of seed fuel channels and blanket fuel channels is 380.

8. The channel type heterogeneous reactor core of claim 1, wherein the channel type heterogeneous core comprises a square lattice pitch of 28.575 cm.

9. The channel type heterogeneous reactor core of claim 1, wherein the CANDU reactor core is an enhanced CANDU-6 (EC-6) reactor core.

10. A heavy water reactor comprising:
a channel type heterogeneous reactor core comprising:
  at least one seed fuel channel region comprising seed fuel channels for receiving seed fuel bundles of thorium based fuel; and
  at least one blanket fuel channel region comprising blanket fuel channels for receiving blanket fuel bundles of thorium based fuel;
wherein the seed fuel bundles have a higher percentage content of fissile fuel than the blanket fuel bundles; and
wherein the at least one seed fuel channel region and the at least one blanket fuel channel region are each substantially circular in cross-section and arranged in an annular pattern within the heterogeneous reactor core, an outermost ring of the annular pattern heterogeneous reactor core comprising the at least one blanket fuel channel region;
wherein the heavy water reactor is an enhanced CANDU-6 (EC-6) reactor; and
wherein 49-51% of the channel type heterogeneous reactor core comprises the seed fuel channel region while the balance comprises the blanket fuel channel region.

* * * * *